United States Patent Office 2,832,783
Patented Apr. 29, 1958

2,832,783

PREPARATION OF PIPERAZINE ADIPATE

Vladimir Petrow and Bennett Sturgeon, London, England, assignors to The British Drug Houses Limited, London, England, a British company No Drawing. Application May 20, 1955
Serial No. 510,026

Claims priority, application Great Britain May 28, 1954

7 Claims. (Cl. 260—268)

The invention is for improvements in, or relating to, piperazine compounds and has particular reference to an improved method for the preparation of piperazine adipate, a valuable anthelmintic agent possessing a wide spectrum of anthelmintic activity.

Hitherto piperazine adipate has been made directly by admixture of piperazine and adipic acid, generally in the presence of a solvent. The cost of the product so obtained, however, is somewhat high, which factor limits the utility of the anthelmintic agent. An improved process for its manufacture is consequently of value by placing the drug within the reach of poor populations, as well as extending the range of its application to veterinary practice, for example in the treatment of worm infections in pigs.

It is an object of the present invention to provide an improved process for the preparation of piperazine adipate whereby it can be prepared at a lower cost than hitherto.

It is a further object of this invention to provide a new process for the isolation of piperazine from crude mixtures containing it.

Commercially, the chief source of piperazine is the minor fraction containing it which is formed as a by-product in the manufacture of ethylene amines. Additionally it has also been prepared by pyrolytic procedures from e. g. diethylene triamine, hydroxyethyl diamine and ethanolamine (hydrohalide). The proportion of piperazine in fractions obtained by such procedures varies with the method of preparation, but usually lies within the limits of 5 to 40%. The other constituents of the mixture vary similarly and may comprise, for example, monoethanolamine, diethanolamine or diethylene triamine. The piperazine is isolated from such fractions by such diverse processes as for example distillation or formation of double salts, which are all effective in varying degrees, but which all add considerably to the cost of the piperazine base and hence to the cost of the piperazine adipate.

We have now discovered a process whereby piperazine adipate may be prepared directly from piperazine fractions or piperazine concentrates without prior isolation of the piperazine thereby achieving a substantial saving in cost so that the anthelmintic agent is made available for wider use in the medical and veterinary fields. The process herein described can also be used for isolating piperazine from mixtures containing it.

The present invention is based upon the observation that whereas piperazine adipate is sparingly soluble in the lower aliphatic alcohols, the adipates of the bases normally present in the above mentioned crude mixtures are readily soluble under these conditions, thereby permitting removal of the piperazine adipate in almost quantitative yield and relatively pure condition.

According to the present invention there is provided a process for the preparation of piperazine adipate which comprises treating a piperazine-containing fraction or concentrate with a lower aliphatic alcohol having from 1 to 5 carbon atoms and with adipic acid in any order.

The piperazine-containing fraction or concentrate may be dissolved in a lower aliphatic alcohol and neutralised with adipic acid, when piperazine adipate will separate out.

Alternatively, an aqueous solution of the piperazine fraction or concentrate may be treated with adipic acid, preferably added in amount sufficient to neutralise the basic material present in the fraction or concentrate, after which the solution is evaporated to dryness and the unwanted impurities removed from the piperazine adipate by treatment with a lower aliphatic alcohol.

Ethanol either as such or as industrial methylated spirit is the preferred lower aliphatic alcohol, but methanol, n- or isopropanol and n-butanol may equally well be employed. When water is used as a solvent for effecting the formation of the piperazine adipate, it is desirable to isolate the piperazine adipate therefrom by evaporating the mixture to dryness and treating the dry residue with industrial methylated spirit to remove extraneous compounds.

The present process has proved successful for preparing piperazine adipate from piperazine fractions containing not more than 5% of piperazine base, as well as with concentrates rich in, or consisting essentially of, piperazine.

If desired the piperazine present in the crude mixture may first be isolated as the adipate as above described, after which the piperazine may be regenerated from the adipate by methods known to those skilled in the art e. g. treatment of a slurry of the adipate with potassium hydroxide solution and acetone.

Following is a description my way of example of methods of carrying the invention into effect.

*Example I*

A piperazine-containing fraction (85 g.) was dissolved in water (1500 ml.) and adipic acid (27.2 g.) was added to reduce the pH to 5.5. The solution was evaporated to dryness and the partially crystalline syrup dried by evaporation with ehanol. The residue was boiled with ethanol (150 ml.) and cooled. Piperazine adipate separated and was collected, M. P. 254–5° C. not depressed on admixture with an authentic specimen, M. P. 255° C., prepared from the pure components. It weighed 12.85 g., corresponding to 5.6% of piperazine in the original material.

The following procedure described the regeneration of piperazine from the adipate:

A slurry of piperazine adipate (15 g.) in water (10 ml.) was treated with 50% potassium hydroxide solution (30 ml.), and acetone (15 ml.) was added. The upper oily layer was separated and the piperazine was recovered from it as the hexahydrate, M. P. 40 to 43° C. by evaporation.

*Example II*

A crude mixture containing piperazine (100 g.) was dissolved in ethanol (110 ml.) and a solution of adipic acid (170 g.) in ethanol (ca. 700 ml.) was run in slowly. Piperazine adipate separated out at once. After allowing to stand it was collected and dried. The weight of piperazine adipate was 58.5 g., corresponding with 21.7% piperazine in the concentrate.

We claim:

1. A process for the preparation of piperazine adipate comprising reacting adipic acid with piperazine in admixture with at least one nitrogenous base selected from the group consisting of monoethanolamine, diethanolamine, and diethylenetriamine, with the piperazine being present to the extent of about 5 to 40% by weight of the mixture, and separating piperazine adipate in relatively pure form from the reaction product by treatment with an unsubstituted aliphatic alcohol having from 1 to 5 carbon atoms.

2. A process as claimed in claim 1 in which said alcohol is methanol.

3. A process as claimed in claim 1 in which said alcohol is ethanol.

4. A process as claimed in claim 1 in which said alcohol is a propanol.

5. A process as claimed in claim 1 in which said alcohol is n-butanol.

6. A process as claimed in claim 1 in which said reaction is carried out in said alcohol as a reaction medium and said relatively pure piperazine adipate is precipitated directly therefrom.

7. A process for the preparation of piperazine adipate comprising reacting in aqueous medium adipic acid with piperazine in admixture with at least one nitrogenous base selected from the group consisting of monoethanolamine, diethanolamine, and diethylenetriamine, with the piperazine being present to the extent of about 5 to 40% by weight of the mixture, the amount of adipic acid being sufficient to neutralize the basic material present, evaporating the solution to dryness, and treating the dried mixture with an unsubstituted aliphatic alcohol having from 1 to 5 carbon atoms to separate relatively pure piperazine adipate from the mixture.

References Cited in the file of this patent

Pollard et al.: J. Am. Chem. Soc., 56, 1759–1760 (1934).

Aelion: Annales de Chemie 3, 55 (1948).

Lieser et al.: Liebigs Annalen 556, 114–126 (1944).